US012036171B2

(12) United States Patent
Cross

(10) Patent No.: US 12,036,171 B2
(45) Date of Patent: Jul. 16, 2024

(54) BODY MASSAGING APPARATUS

(71) Applicant: THE ARMAID COMPANY, INC., Blue Hill, ME (US)

(72) Inventor: Terry Cross, Blue Hill, ME (US)

(73) Assignee: Range of Motion Products, LLC, Encinitas, CA (US)

( * ) Notice: Subject to any disclaimer, the term of this patent is extended or adjusted under 35 U.S.C. 154(b) by 860 days.

(21) Appl. No.: 15/095,010

(22) Filed: Apr. 8, 2016

(65) Prior Publication Data

US 2016/0296415 A1 Oct. 13, 2016

Related U.S. Application Data

(60) Provisional application No. 62/144,714, filed on Apr. 8, 2015, provisional application No. 62/195,136, filed on Jul. 21, 2015.

(51) Int. Cl.
*A61H 15/00* (2006.01)

(52) U.S. Cl.
CPC . *A61H 15/0092* (2013.01); *A61H 2015/0014* (2013.01); *A61H 2015/0042* (2013.01);
(Continued)

(58) Field of Classification Search
CPC ................ A61H 15/0092; A61H 15/00; A61H 2015/0014; A61H 2015/0042;
(Continued)

(56) References Cited

U.S. PATENT DOCUMENTS 1,757,060 A * 5/1930 Rieth ................. A61H 15/0092 601/125
5,433,688 A * 7/1995 Davies ............... A63B 21/0552 482/124

(Continued)

FOREIGN PATENT DOCUMENTS

WO WO-2010019190 A2 * 2/2010 ......... A61H 15/0085
WO 2013/070632 A1 5/2013

OTHER PUBLICATIONS

International Search Report & Written Opinion for PCT/US16/26836 dated Aug. 18, 2016; 6 pages.

(Continued)

*Primary Examiner* — Justine R Yu
*Assistant Examiner* — Matthew D Ziegler
(74) *Attorney, Agent, or Firm* — Heidi Eisenhut; LOZA & LOZA, LLP

(57) ABSTRACT

A self-operated, or therapist assisted, apparatus particularly adapted for massaging a user's body parts affected by repetitive strain injuries such as tendinitis and carpal tunnel syndrome, comprises two clamping arms joined at a base end and provided with an opening at the other end. Flexible massaging members are mounted on opposite medial sections of the arms. A body part may be placed between the two arms of the device to be acted upon by the massaging members, whereby the body part is adjustably clamped between the pair of massaging members and massaged by translating and rotating movements of the body part along an axis perpendicular to the mounting axes of the massaging members. Alternatively, one of the arms of the apparatus may be separated from the apparatus and used independently to massage body parts that otherwise would not fit between the arms of the apparatus.

13 Claims, 14 Drawing Sheets

(52) U.S. Cl.
CPC .................. *A61H 2015/005* (2013.01); *A61H 2201/0192* (2013.01); *A61H 2201/1253* (2013.01); *A61H 2201/1635* (2013.01); *A61H 2201/1638* (2013.01); *A61H 2201/164* (2013.01); *A61H 2205/06* (2013.01); *A61H 2205/102* (2013.01); *A61H 2205/12* (2013.01)

(58) Field of Classification Search
CPC ...... A61H 2015/005; A61H 2015/0007; A61H 2201/0192; A61H 2201/1253; A61H 2201/1635; A61H 2201/1638; A61H 2201/164; A61H 2201/16; A61H 2201/1602; A61H 2205/06; A61H 2205/102; A61H 2205/12
USPC .................................................... 482/92–139
See application file for complete search history.

(56) References Cited

U.S. PATENT DOCUMENTS 5,519,918 A * 5/1996 Chang .................... A63B 23/16 16/430
5,730,708 A 3/1998 Spratt
5,792,081 A 8/1998 Cross
6,443,879 B1 * 9/2002 Chen .................... A61H 1/0218 482/143
7,163,500 B2 * 1/2007 Endelman .............. A63B 21/04 482/139
7,569,005 B2 * 8/2009 Geeting ............. A63B 21/0004 482/121
8,152,705 B2 * 4/2012 Rooks ................ A63B 22/0087 482/142
9,168,196 B2 * 10/2015 Dagan .................... A61H 7/003
9,301,900 B2 * 4/2016 Johnston ................ A61H 7/007
9,687,384 B2 * 6/2017 Park ....................... A61H 15/00
2004/0142802 A1 * 7/2004 Greenspan ........... A61H 1/0237 482/146
2005/0159688 A1 * 7/2005 Sakamoto .......... A61H 15/0092 601/123
2007/0010767 A1 * 1/2007 Hsieh ................... A61H 9/0078 601/96
2008/0221494 A1 * 9/2008 Squillace ........... A61H 15/0092 601/134
2009/0197741 A1 * 8/2009 Poillucci .............. A61H 1/0285 482/44
2011/0105968 A1 * 5/2011 Angell ................... A61H 15/00 601/132
2011/0137218 A1 6/2011 Collins
2011/0251026 A1 * 10/2011 Stephan ............. A63B 21/0004 482/93
2013/0018290 A1 * 1/2013 Holdorf ............. A61H 15/0092 601/128
2013/0289454 A1 10/2013 Wang et al.
2014/0039363 A1 2/2014 Johnston
2015/0190679 A1 * 7/2015 Carbone .............. A63B 26/003 482/146

OTHER PUBLICATIONS

"ARMAID", copyright 2019 by The Armaid Company, Inc., retrieved from the internet, https://armaid.com/, on Jun. 3, 2019.
EP Appln. No. 16777453.8. Extended EP Search Report (Oct. 1, 2018).

* cited by examiner

BODY MASSAGING APPARATUS

CROSS REFERENCE TO RELATED APPLICATIONS

This application claims priority to a provisional application, U.S. Ser. No. 62/144,714, filed Apr. 8, 2015, entitled Limb Massager, by Terry Cross, which is hereby incorporated by reference. This application further claims priority to a provisional application, U.S. Ser. No. 62/195,136, filed Jul. 21, 2015, entitled Limb Massager, by Terry Cross, which is hereby incorporated by reference.

FIELD

The present disclosure relates to self-operated massaging devices and therapist facilitated and more particularly multi-functional full body massager apparatus having a plurality of components which may be separated and used independently of the full body massager apparatus as a whole.

BACKGROUND

In the field of physical therapy self-operated body and therapist facilitated massaging devices have been known to be adapted for the treatment of wrists and arms affected by carpal tunnel syndrome, tendonitis and repetitive strain and overuse injuries and for the treatment of muscular and connective tissue anomalies of the neck, shoulder girdle, elbows, hips, knees, thighs, calves, ankles, feet, toes and fingers.

However, most self-operated and therapist facilitated massaging devices are hand-held massagers that do not provide for any stabilizing support to create a counterforce and therefore cannot apply any substantial amount of controllable therapeutic pressure on the ailing muscle, tendon, or joint. As it relates to self-use and facilitated use, other automatic massaging devices driven by electric motors are not capable of reacting to a sudden pain felt by the user, and, therefore can inflict a great deal of unnecessary suffering before the user or therapist can turn off the device as the massaging heads reach a particular sensitive spot. Other manual massage devices are set at specific points and do not have the capability for the user or therapist to adjust pressure in real time There is therefore a need for a simple and inexpensive, yet effective self-operated (or hand-operated) full body trigger point and active muscle release massaging apparatus which can be firmly stabilized (creating significant counterforce) and applied under the user's or therapist's own motions without risk of inflicting undue pain or discomfort and offers unlimited control of all vectors, angles and pressure in order for the user to be in constant and immediate control for the user to change any variables easily.

Therapeutic massage that emphasizes targeting trigger points and or an active release of muscle tension requires the unique stabilized compressive counterfource offered by this device. Until now, there has been now efficient and effective way for compressive counterfource to be achieved on all limbs and areas of the body. The device described herein employes a biomechanically and ergonomically novel design that provides self-users and facilitated users the ability to perform therapeutic techniques that previously required substantial professional therapeutic training or were not possible to do immediately.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one feature, a body massaging apparatus is provided. The apparatus may include a first arm, having a first arm upper end and a first arm lower end where the first arm lower end has a pair of elongated members extending outward therefrom and separated by a channel, where each of the elongated members in the pair of elongated members having a slotted guideway. The apparatus may further include a second arm having a second arm upper end and a second arm lower end, the second arm lower end having a securing member adapted to be received in a pair of depressions formed in the slotted guideway of the each of the elongated members in the pair of elongated members, where the second arm is rotatable and removeable in relation to the first arm. A medial section of the first arm may include a first massaging member and a medial section of the second arm may include a second massaging member.

According to one aspect, a base is connected to bottom surfaces of the elongated members of the first arm.

According to another aspect, the first arm comprises an outer surface; an inner surface having a first cavity adapted to receive the first massaging member; and an inner wall integrally connected between the outer and inner surfaces.

According to yet another aspect, the outer surface has an arcuate shape and the inner surface comprises an upper portion; a lower portion; and a medial portion integrally connected between the upper portion and the lower portion by an upper edge portion and a lower edge portion, the upper and lower edge portions extend perpendicularly outward from the medial portion forming the first cavity.

According to yet another aspect, the upper portion and the lower portion are located within a first vertical plane and the medial portion is located within a second vertical plane, where the first vertical plane is different than the second vertical plane.

According to yet another aspect, the second arm comprises: an outer surface; an inner surface having a second cavity adapted to receive the second massaging member; and an inner wall integrally connected between the outer and inner surfaces.

According to yet another aspect, the outer surface of the second arm has an arcuate shape and the inner surface comprises: an upper portion; a lower portion; and a medial portion integrally connected between the upper portion and the lower portion by an upper edge portion and a lower edge portion, the upper and lower edge portions extend perpendicularly outward from the medial portion forming the second cavity.

According to yet another aspect, the upper portion and the lower portion are located within a first vertical plane and the medial portion is located within a second vertical plane, where the first vertical plane is different than the second vertical plane.

According to yet another aspect, a first handle connected to, and extending perpendicularly outward from the first arm upper end; and a second handle connected to, and extending perpendicularly outward from the second arm upper end.

According to yet another aspect, a tensioning member comprising an elasticized band may be adapted to be wrapped around the first upper arm end and the second upper arm end for adjusting tension between the first and second arms.

According to yet another aspect, a toggle having and elasticized cord connected to an elongated toggle member, the elasticized cord adapted to wrap around at least one of the first arm upper end or the second arm upper end.

According to yet another aspect, the first and second arms and the first and second massaging members are shaped and dimensioned to adjustably retain a human body part between the first massaging member and the second massaging member when the first arm upper end and the second upper arm end are and held in close proximity to each other, whereby pressure that is applied to the human body part is variable and dynamically leveraged as the human body part is moved between the first and second arms relative thereto.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

Figure 1:
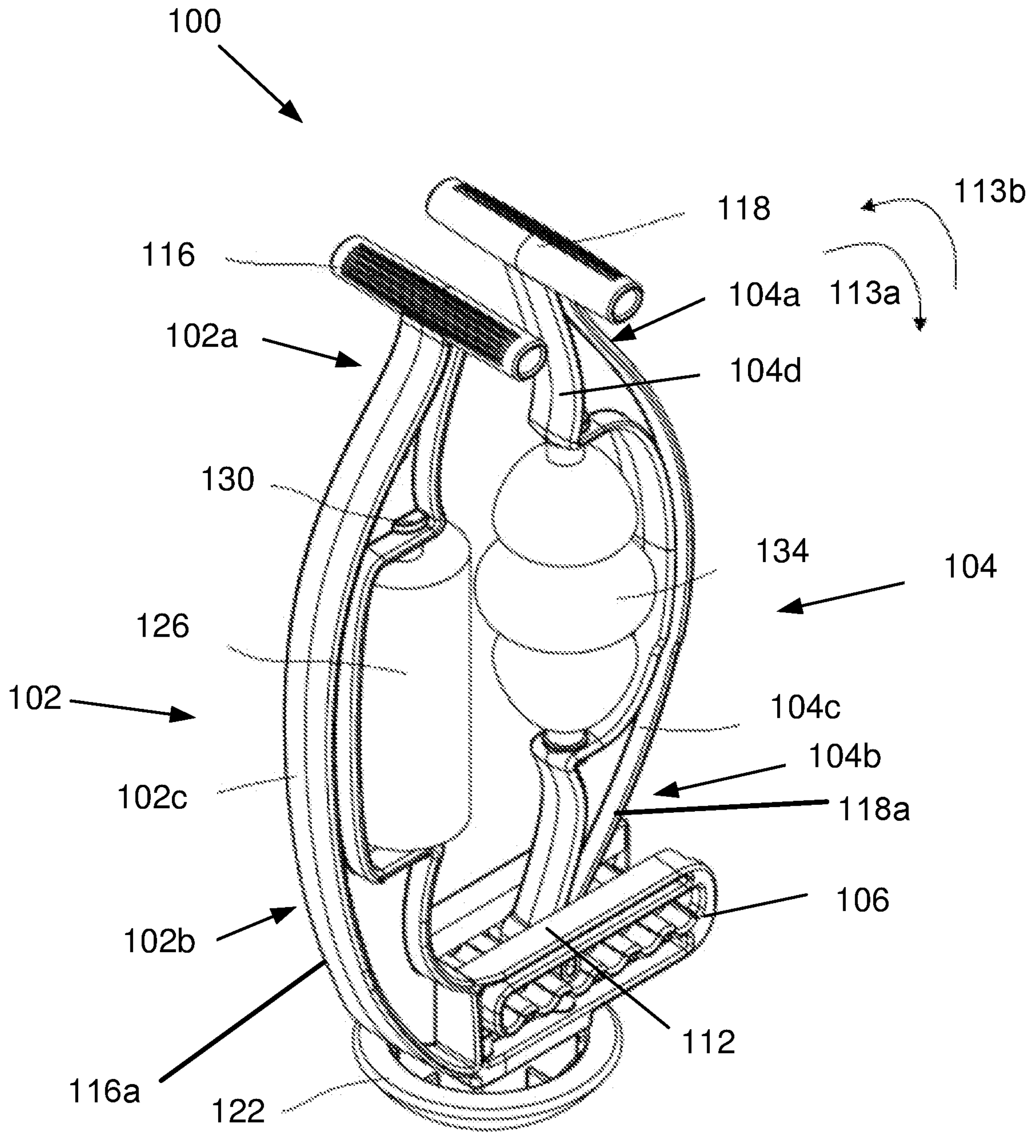
FIG. 1 is a side perspective view of a body massaging apparatus, according to one aspect.

In the following description, specific details are given to provide a thorough understanding of the embodiments. However, it will be understood by one of ordinary skill in the art that the embodiments may be practiced without these specific details.

Overview

Embodiments of the present disclosure are directed to a multi-functional full body massaging apparatus. The multi-functional full body massaging apparatus may also be referred to as a multi-functional full body trigger point and active muscle release massaging apparatus. The multi-functional body massager apparatus is a hand-operated, body-massaging apparatus for the preventive or remedial treatment of muscular, connective tissue, and joint disorders and more specifically for the treatment of repetitive strain injuries and overuse injuries such as carpal tunnel syndrome, elbow tendinitis, knee tendinitis, Achilles tendinitis, general joint arthritis and the like. The apparatus is in the form of a simple, yet efficient device that allows for stable and easily controllable application of rolling pressure to the affected area.

These and other valuable objects are achieved by a self-operated or facilitated apparatus full body massaging apparatus comprising two arms (for example clamping arms) removably joined about a base, which can be placed on any surface and positioned to any desired orientation, and provided with an opening at the other end. The arms are adjustable relative to each other, providing for use with varying sized body parts. Massaging members installed in a face-to-face arrangement in medial sections of the arms can be brought to work against body parts while the free upper ends of the arms are held together with the free hand of a user. The apparatus may be adapted for massaging body parts of a user affected by repetitive strain injuries and joint conditions, including but not limited to tendinitis, carpal tunnel syndrome, and arthritis. Flexible massaging members may be mounted on or secured within opposite medial sections of the arms. A body part may be placed between the two arms of the device to be acted upon by the massaging members, whereby the body part is adjustably clamped (via stabilized counterforce) between the pair of massaging members and massaged by translating and rotating movements of the body part along an axis perpendicular to the mounting axes of the massaging members.

Alternatively, the free upper ends of the arms may be held in close proximity to each other by a tensioning component or toggle, with or without the assistance of the free hand of the user. The apparatus may compress (via stabilized counterforce) the body part from opposite sides to enhance blood and lymph circulation through muscle tissue, connective tissue, and joints. The relaxing effect on connective tissue and strengthening effect of active muscle release allows for a greater range of muscular motion and optimized muscular function. Moreover, the apparatus furthers the increase of the range of motion (ROM) of muscles subjected to massage, so tight muscles do not incessantly pull on the boney attachment across specific joints where they are attached through tendons. Increasing the muscle ROM reduces the muscles pulling at their tendons wherever they are attached. The apparatus has been designed for the user to apply several techniques including, but not limited to, Active Release/Trigger Point Therapy and Cross Fiber Friction and Myofasical Release Technique, all to specifically increase ROM, neuromuscular re-education and joint function.

Alternatively, one of the arms of the apparatus may be separated from the apparatus and used independently to massage body parts that otherwise would not fit between the arms of the apparatus. Additionally, the massaging members may be separated from the arms in which they are secured and used independently to massage body parts that otherwise would not be reachable when attached to an arm.

Body Massaging Apparatus

Figure 2:
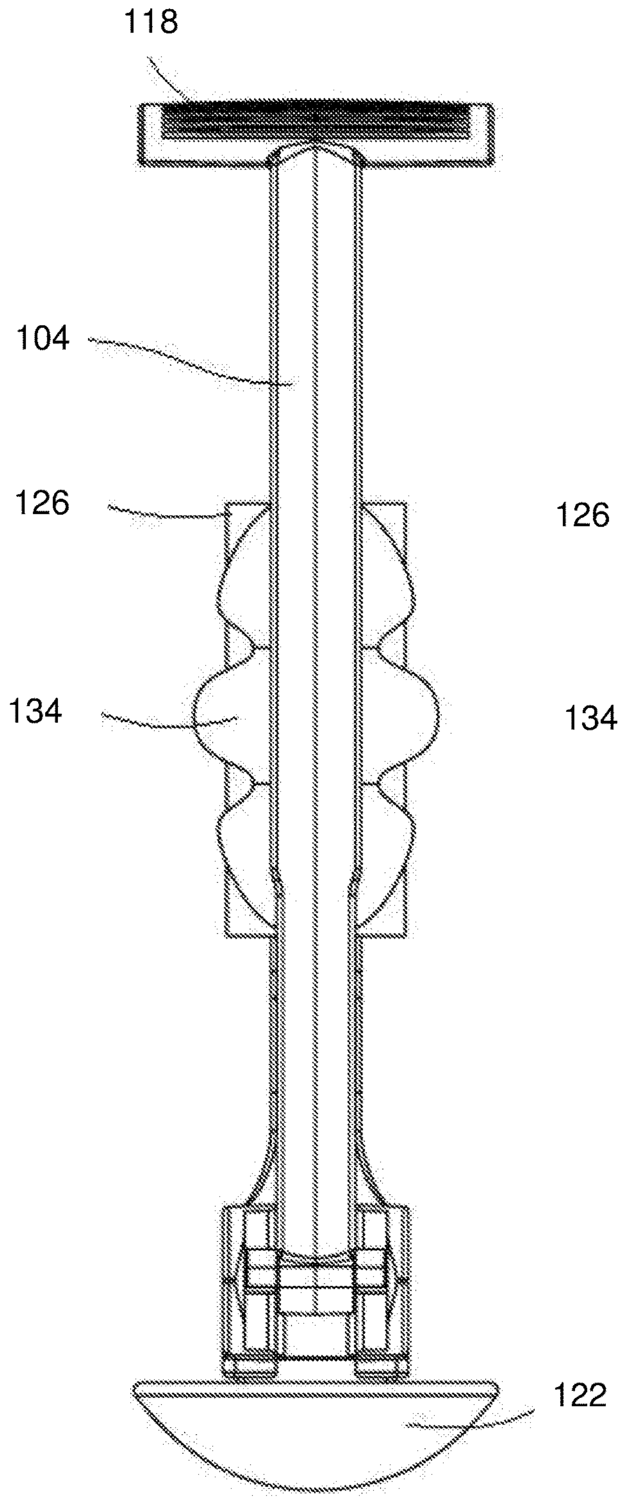
FIG. 2 is a first side view of the body massaging apparatus of FIG. 1.
Figure 3:
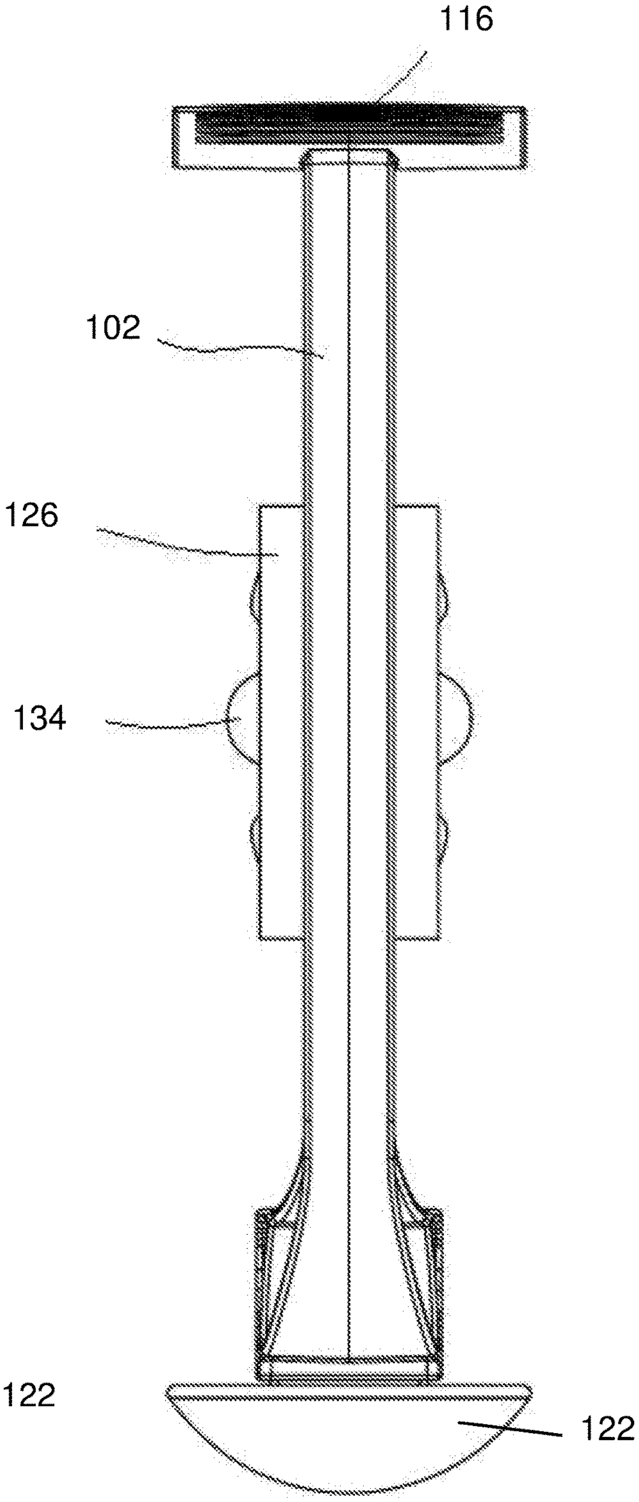
FIG. 3 is a second side view of the body massaging apparatus of FIG. 1.
Figure 4:
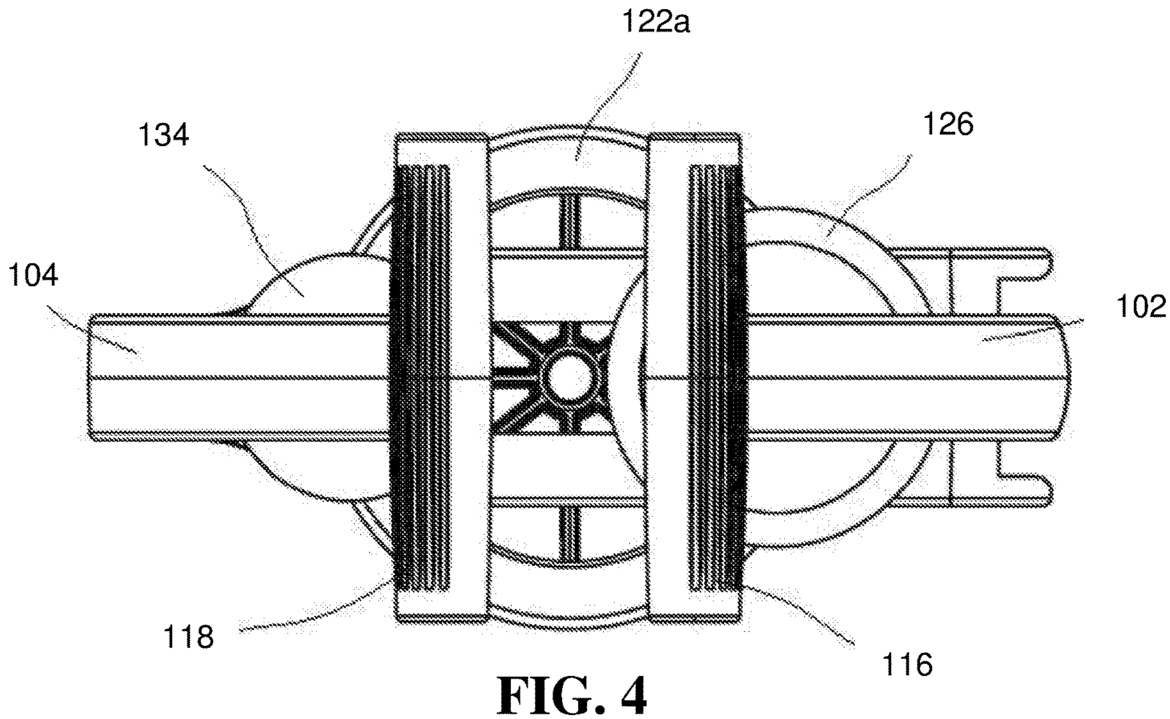
FIG. 4 is a top view of the body massaging apparatus of FIG. 1.
Figure 5:
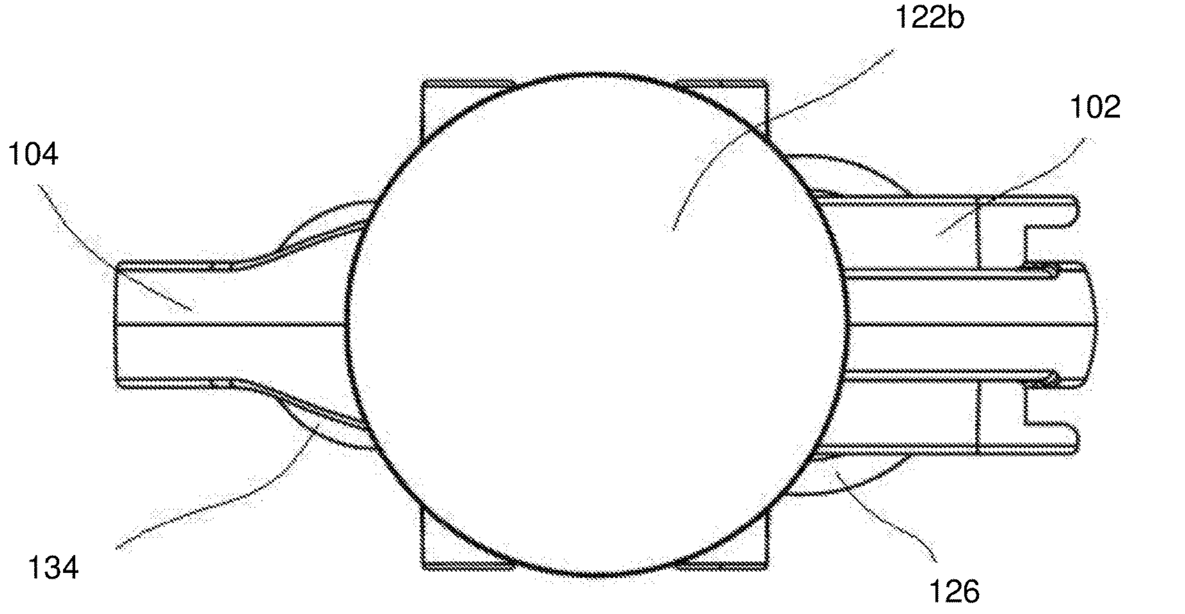
FIG. 5 is a bottom view of the body massaging apparatus of FIG. 1.
Figure 6:
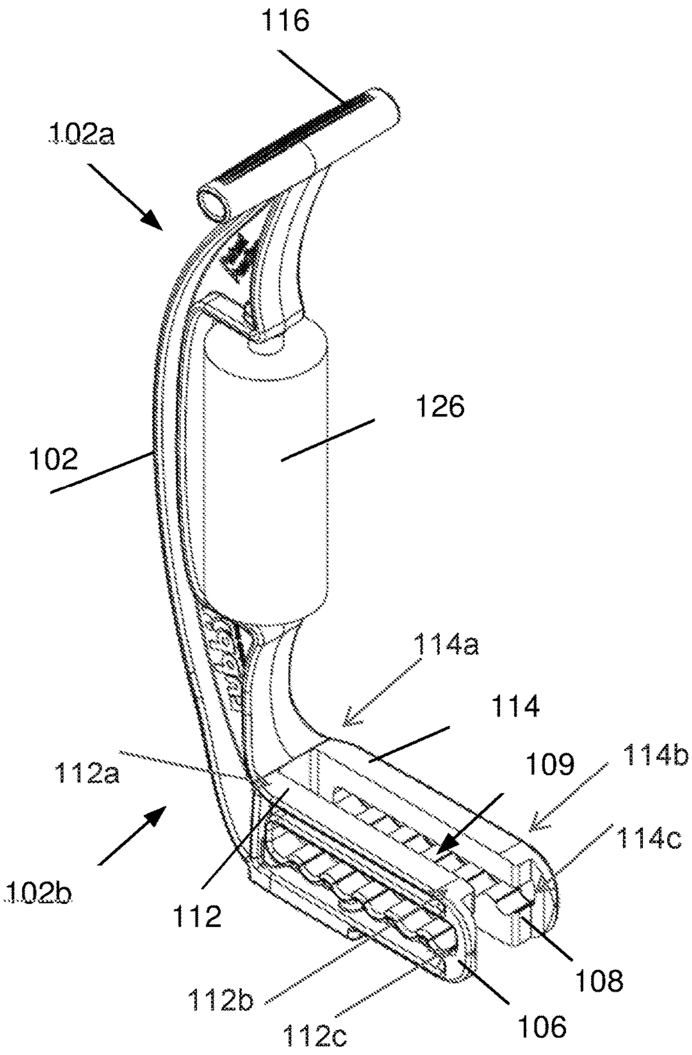
FIG. 6 is a side perspective view of a first arm of the body massaging apparatus of FIG. 1.
Figure 7:
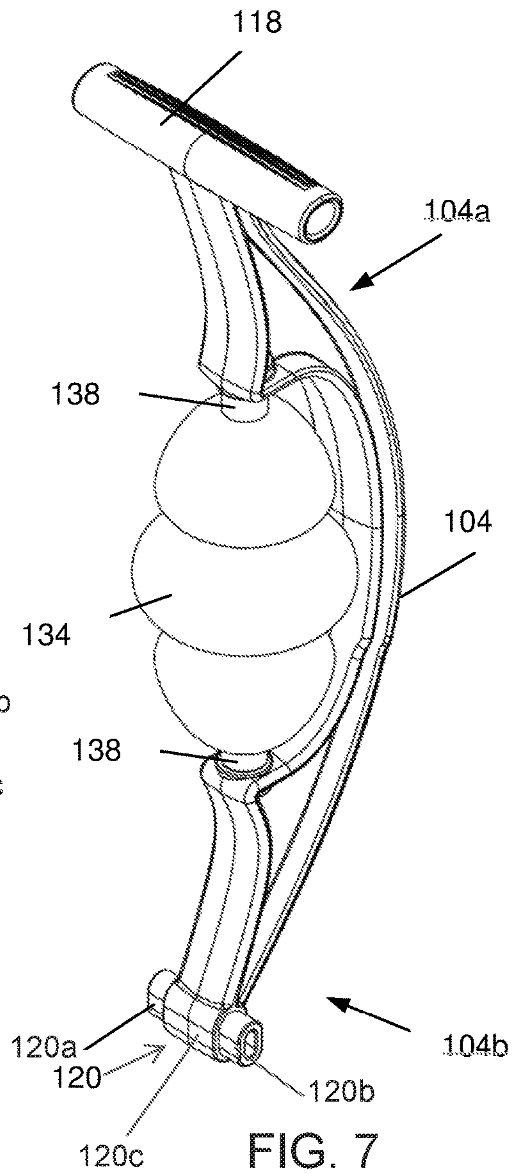
FIG. 7 is a side perspective view of a second arm of the body massaging apparatus of FIG. 1.
Figure 8:
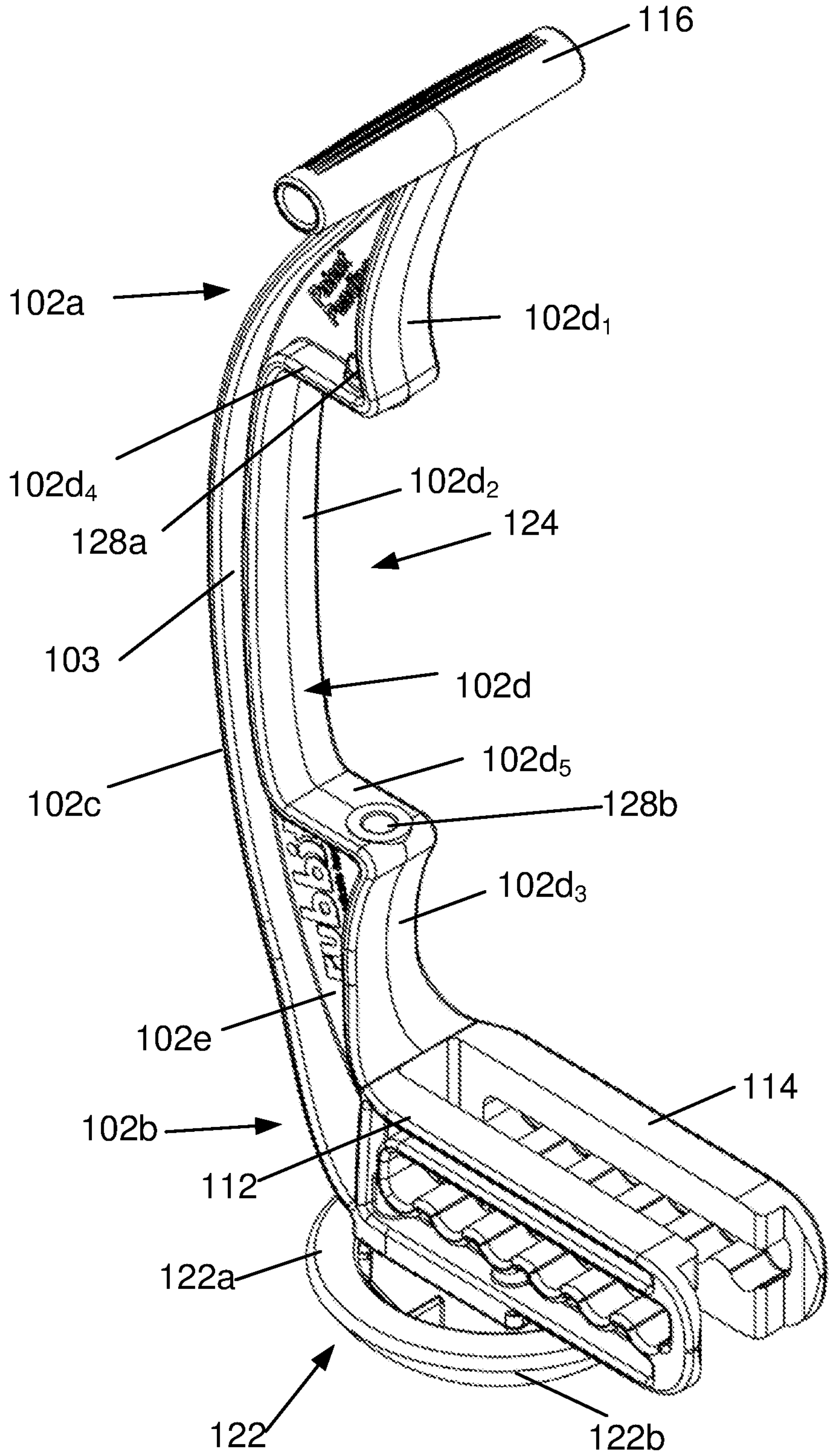
FIG. 8 is a side perspective view of the first arm of the body massaging apparatus of FIG. 1 without a massaging member.
Figure 9:
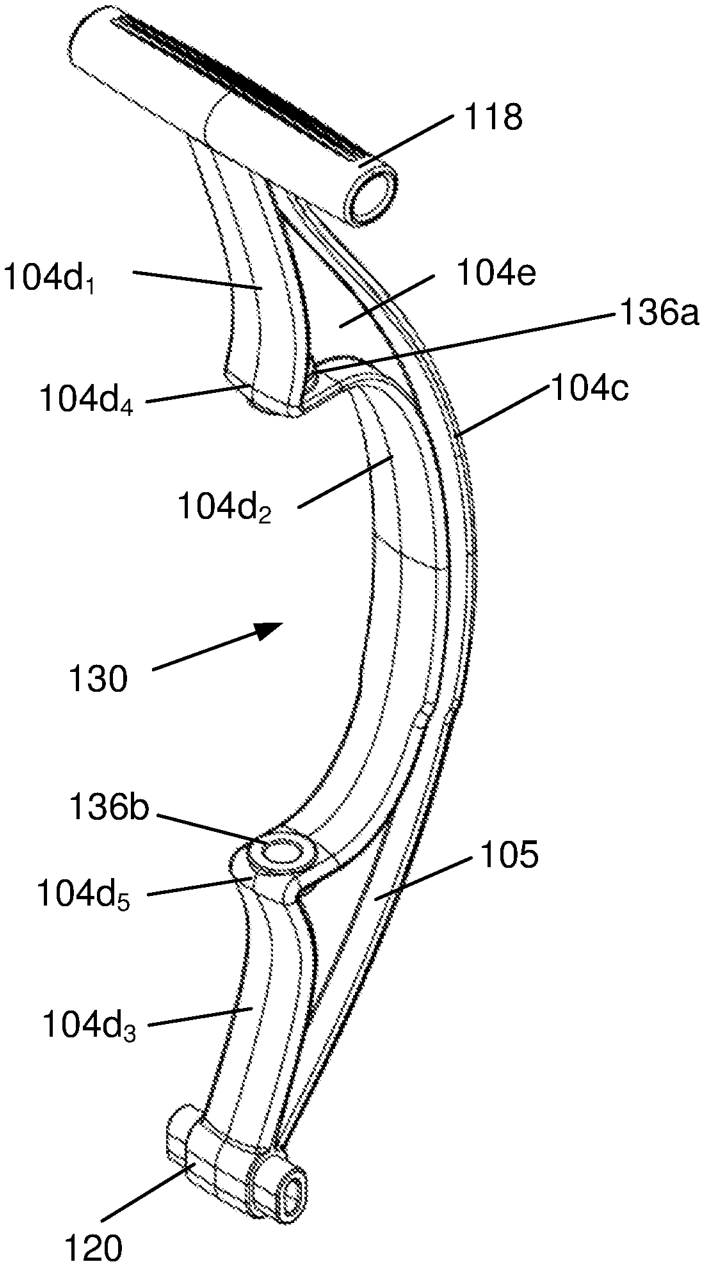
FIG. 9 is a side perspective view of the second arm of the body massaging apparatus of FIG. 1 without a massaging member.

FIG. 1 is a side perspective view of a body massaging apparatus, according to one aspect. FIG. 2 is a first side view of the body massaging apparatus of FIG. 1. FIG. 3 is a second side view of the body massaging apparatus of FIG. 1. FIG. 4 is a top view of the body massaging apparatus of FIG. 1. FIG. 5 is a bottom view of the body massaging apparatus of FIG. 1. FIG. 6 is a side perspective view of a first arm of the body massaging apparatus of FIG. 1. FIG. 7 is a side perspective view of a second arm of the body massaging apparatus of FIG. 1. FIG. 8 is a side perspective view of the first arm of the body massaging apparatus of FIG. 1 without a massaging member. FIG. 9 is a side perspective view of the second arm of the body massaging apparatus of FIG. 1 without a massaging member. The following discussion refers interchangeably to FIGS. 1-9.

As shown, the body massaging apparatus 100 may include a first arm 102, having a first arm upper end **102*a* and a first arm lower end 102*b*, and a second arm 104, having a second arm upper end 104*a* and a second arm lower end 104*b*. The first and second arms 102, 104 may be maintained in an adjustable relationship to each other. That is, the first and second arms 102, 104 may be set by the user at various discrete distances from each other to create a desired gap or space between the arms 102, 104 by moving or rotating one or both of the arms along an axis perpendicular to mounting axes of the massaging members. The size of the gap is adjustable so that the gap can be adapted to receive and accommodate a body part to which the body massaging apparatus 100 is being used on. Large gaps being necessary to accommodate larger body parts, such as legs and arms, with smaller gaps being necessary to accommodate smaller body parts, such as fingers. According to one aspect, the second arm 104 may be removable from the first arm 102 and used independently of the apparatus as a whole to massage body parts that otherwise would not fit between the arms 102, 104 of the body massaging apparatus 100**.

A first handle 116 may be integrally connected to, and extend perpendicularly outward from, the first arm upper end **102*a* and a second handle 118 may be integrally connected to, and extend perpendicularly outward from, the second arm upper end 104*a*. Although the first and second handles 116, 118, also referred to herein as a first arm upper grip 116 and a second arm upper grip 118. As shown in FIG. 1, the first arm 102 further includes a first arm lower grip 116*a* and the second arm 104 may further included a second arm lower grip 118*a* arranged and engaged with the first arm such that the first arm is suitable for massaging body parts when disengaged from the second arm. The first and second handles (or upper grips 116 and 118 respectively) are shown as having elongated tubular configurations, this is by way of example only and the first and second handles 116, 118** may utilize any configuration known in the art and may be solid instead of tubular.

The first arm lower end **102*b* may include a first elongated member 106 integrally connected to, and extending perpendicularly outward from, a first side of the first arm 102 and a second elongated member 108 may be integrally connected to, and extending perpendicularly outward, from a second side of the first arm 102. The first and second elongated members 106, 108 are parallel to each other. The first elongated member 106 may be separated from the second elongated member 108 forming a space or channel 109 adapted or configured to receive the second arm lower end 104*b* of the second arm 104. The channel 109 having a first end and an opposing second end where the second end terminates in an opening allowing for the first and second arms 102, 104** to be disconnected from one another.

Each of the first and second elongated members 106, 108 may have a generally rectangular configuration and include a slotted guideway 112 and 114, respectively, having corresponding discrete pairs of depressions along its length. The depressions may be adapted or configured to receive and engage with a securing member 120 located on the second arm lower end **104*b* allowing the second arm 104 to rotate relative to the first arm and along an axis perpendicular to the mounting axes of massaging members described below. As shown, a securing member having an oblong cross section integrally connected to, and extending perpendicularly outward from each side of the second arm lower end dimensioned and adapted to be removably received within a depression formed in each of the slotted guideways of each of the elongated members in the pair of elongated members, where the securing member having the oblong cross section is arranged such that the second arm is at least partially rotatable relative to the first arm about the securing member having the oblong cross section when the first arm is releasably engaged with the second arm, such that rotation of the second arm in a first direction (113*a*) orients the securing member having the oblong cross section within each depression in the slotted guideway allowing movement along the slotted guideways between a first depression in the slotted guideway to a second depression in the slotted guideway, and rotation of the second arm in a direction opposite the first direction (113*b***) results in releasable engagement between the first arm and the second arm via engagement between the securing member having the oblong cross section and the corresponding depression in the slotted guideway, and where the securing member having the oblong cross section is removeable through the first and second openings of the slotted guideways allowing for the second arm to be disconnected and disengaged from the first arm.

A securing member 120 may be integrally connected to the second arm lower end **104*b* and adapted to be received within the slotted guideways 112, 114 of the first elongated member 106 and the second elongated member 108 each having a plurality of depressions. As shown in FIG. 7, the securing member may be an oblong-shaped pin having a center portion 120*c* integrally connected to, and between, a first side portion 120*a* and a second side portion 120*b*. The first and second side portions 120*a*, 120*b* have a width that is smaller than the width of the center portion 120*c* so that the first side portion 120*a* of the securing member 120 may be inserted into a depression of the first slotted guideway 112 and the second side portion 120*b* of the securing member 120 may be inserted into a corresponding depression of the second guideway 114 to achieve a desired relative positioning of the first and second arms 102, 104. Next, the second arm 104 may be pivoted into a substantially parallel orientation to the first arm 102, causing the securing member 120** to engage with the depressions in the first and second elongated members 106, 108 to maintain spacing of the arms 102, 104 as desired. That is, lock the first and second side portions 120*a*, 120*b* into place in the depressions. To adjust the spacing of the first and second arms 102, 104 with respect to each other, the second arm 104 may be pivoted rotating the securing member 120 (or oblong pin) within the channel allowing the first and second side portions 120*a*, 120*b* of the securing member 120 to move from one depression to another. To lock the securing member 120 into place, the second arm 104 is rotated or pivoted back into the substantially parallel orientation to the first arm 102. As described above, a user may place a body part between the two arms of the apparatus to be acted upon by massaging members secured to medial portions of each of the arms, whereby the body part is adjustably clamped between the pair of massaging members and massaged by translating and rotating movements of the body part along an axis perpendicular to the mounting axes of the massaging members.

According to one aspect, a base 122 may be connected, either fixedly or removably, to the bottom surfaces of the slotted guideways 112 and 114 at the first arm lower end 102*b*. The base 122 may have a substantially planar upper portion 122*a* and a lower portion 122*a* have a generally circular or rounded configuration, such as a portion of a sphere. The lower portion 122*b* of the base 122 may be made of, or covered with, a high-stick, non-skid material, so that the body massaging apparatus 100, when placed on a surface, remains substantially in place during use. The rounded shape of the lower portion 122*b* of the base 122 (when in contact with a surface or other object) allows the body massaging apparatus 100 to be pivoted in relation to the surface in order to precisely orient the body massaging apparatus 100 at any desired angle. The lower portion 122*b* of the base 122 may have a semi-circle configuration. The surface upon which the base 122 may be placed, for example, include a table top, the floor, the thigh or other body part of a user, a wall, or any other suitable surface. The base 122 of the body massaging apparatus 100 may also be used as a handle to support the position and movement of the body massaging apparatus 100, for example, when the body massaging apparatus 100 is used on a leg (rather than moving the leg through a stationary device, the body massaging apparatus 100 is moved over the stationary leg). In this example, the user's other hand grasps the first and second handles 116, 118 to regulate pressure being applied to the leg.

The first arm 102 may have an outer surface 102*c* and an inner surface 102*d* separated by and integrally connected, to an inner wall 102*e* of the first arm 102. According to one aspect, the thickness of the inner wall 102*e* may be smaller than the widths of the outer and inner surfaces 102*c*, 102*d* forming a ridge or lip 103 allowing for a user to easily grasp the first arm 102. The inner surface 102*d* may have a first opening or cavity 124 adapted or configured to receive a first massaging member 126. (See FIG. 1) According to one example, the outer surface 102*c* of the first arm 102 may have a generally continuous arcuate shape while the inner surface 102*d* may include an upper portion 102$d_1$, a medial portion 102$d_2$ and a lower portion 102$d_3$ where the medial portion 102$d_2$ is integrally connected between the upper portion 102$d_1$ and the lower portion 102$d_3$. The medial portion 102$d_2$ may be connected to the upper portion 102$d_1$ by an upper edge portion 102$d_4$ and the lower portion 102$d_3$ by a lower edge portion 102$d_5$. According to one example, the upper edge portion 102$d_4$ and the lower edge portion 102$d_5$ may extend substantially perpendicularly outward from the upper and lower ends of the medial portion 102$d_2$, respectively, creating or forming the first cavity 124 in the first arm 102. Although all portions 102$d_1$-102$d_3$ are shown having an arcuate shape, this is by way of example only. As shown in FIG. 8, the upper portion 102$d_1$ and the lower portion 102$d_3$ are located within a first vertical plane and the medial portion 102$d_2$ is located within a second vertical plane where the first vertical plane is different than the second vertical plane.

According to one aspect, the upper edge portion 102$d_4$ of the inner surface 102*d* of the first arm 102 may include a first aperture 128*a* and the lower edge portion 102$d_5$ of the inner surface 102*d* of the first arm 102 may include a second aperture 128*b*. The first massaging member 126 may have an elongated configuration including a roller secured or mounted to a substantially rigid shaft 130 adapted or configured to be received within the first and second apertures 128*a*, 128*b* securing the first massaging member 126 to the first arm 102. The first massaging member 126 may be rotatable by the roller rotating around the shaft 130 or the shaft 130 being rotatable when secured within the first and second apertures 128*a*, 128*b*. The roller may be formed of any type of material known in the art such as foam, rubber or plastic.

As shown in FIG. 9, the second arm 104 may have an outer surface 104*c* and an inner surface 104*d* separated by and integrally connected to an inner wall 104*e*. According to one aspect, the thickness of the inner wall 104*e* may be smaller than the widths of the outer and inner surfaces 104*c*, 104*d* forming a ridge or lip 105 allowing for a user to easily grasp the second arm 104. The inner surface 104*d* of the second arm may have a second opening or cavity 132 adapted or configured to receive a second massaging member 134. (See FIG. 1) According to one example, the outer surface 104*c* may have a generally continuous arcuate shape while the inner surface 104*d* may include an upper portion 104$d_1$, a medial portion 104$d_2$ and a lower portion 104$d_3$ where the medial portion 104$d_2$ is integrally connected between the upper portion 104$d_1$ and the lower portion 104$d_3$. The medial portion 104$d_2$ may be connected to the upper portion 104$d_1$ by an upper edge portion 104$d_4$ and the lower portion 104$d_3$ by a lower edge portion 104$d_5$. According to one example, the upper edge portion 104$d_4$ and the lower edge portion 104$d_5$ may extend substantially perpendicularly outward from the medial portion 104$d_2$ creating or forming the second cavity 130 in the second arm 104. Although all portions 104$d_1$-104$d_3$ are shown having an arcuate shape, this is by way of example only and may have any other shape. As shown in FIG. 9, the upper portion 104$d_1$ and the lower portion 104$d_3$ are located within a first vertical plane and the medial portion 104$d_2$ is located within a second vertical plane where the first vertical plane is different than the second vertical plane.

According to one aspect, the upper edge portion 104$d_4$ of the inner surface 104*d* of the second arm 104 may include a first aperture 136*a* and the lower edge portion 104$d_5$ of the inner surface 104*d* of the second arm 104 may include a second aperture 136*b*. The second massaging member 134 may include a multi-curved contoured roller secured or mounted to a substantially rigid shaft 138 adapted or configured to be received within the first and second apertures 136*a*, 136*b* securing the second massaging member 134 to the second arm 104. The second massaging member 126 may be rotatable by the multi-curved contoured roller rotating around the shaft 138 or the shaft 138 being rotatable when secured within the first and second apertures 136*a*, 136*b*. Alternatively, the second massaging member may remain in a fixed stationary (i.e. not rotatable) position. The multi-curved contoured roller may be made from any type of material known in the art including a resilient material such as foam or rubber. The unique shape of the multi-curved contoured roller is designed to properly perform various desired therapy techniques as is known in the art. According to one example, the second massaging member 134 "gives" (e.g., is resilient and flexible) to absorb the necessary flex when under use. It also has specifically designed curves to give the necessary intensity on particular spots so effective therapy can be performed.

Figure 10:
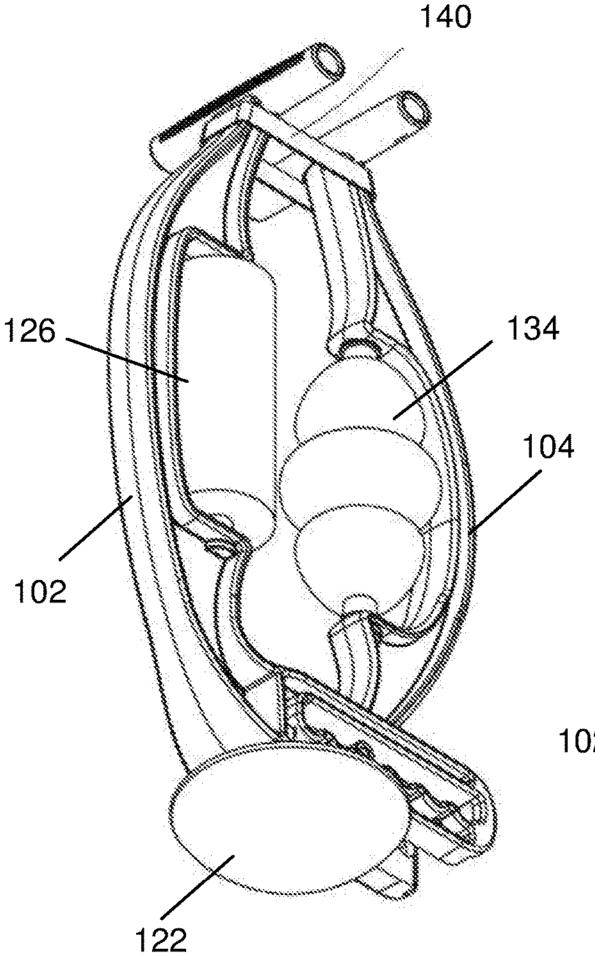
FIG. 10 is a side perspective view of the body massaging apparatus of FIG. 1 utilizing a tensioning device, according to one aspect.
Figure 11:
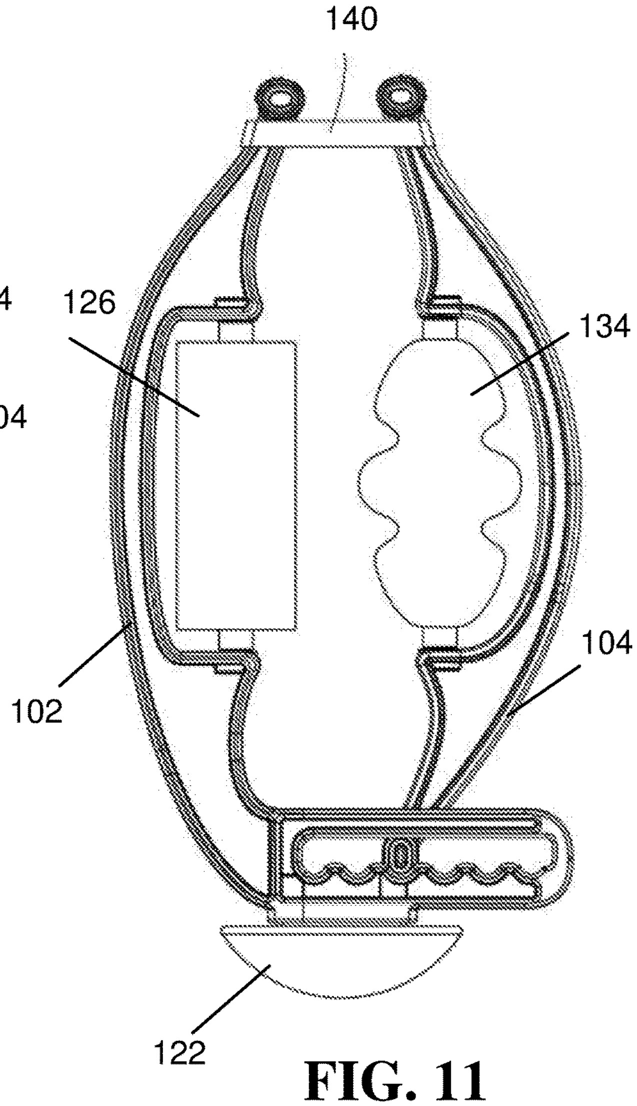
FIG. 11 is a side plan view of the body massaging apparatus of FIG. 10.

When the first and second arms 102, 104 of the body massaging apparatus 100 are used together, a user may place or insert a body part between them allowing the user to perform various different desired therapy techniques known in the art. As shown in FIGS. 10 and 11, the body massaging apparatus 100 may further comprise a tensioning device 140. The tensioning device 140 may be adapted to be placed around the first arm upper end 102*a* and the second arm upper end 104*a* below the first and second handles 116, 118 respectively, to maintain or hold the first and second arms 102, 104 together in close proximity to each other. The tensioning device 140 may be used to supplement the user's hand in holding the first and second arms 102, 104 in close proximity to each other, or replace the use of the user's hand altogether freeing up the hand of the user.

According to one example, the tensioning device 140 may be made of an elasticized material, such as a rubber band or a bungee cord, however a non-elasticized material may also be used. Use of an elasticized material allows the first and second arms 102, 104 to apply an inward force directed towards each other while also providing for some amount of "give" with the first and second arms 102, 104 being able to move apart from each other when necessary, for example, when the body massaging apparatus 100 is moved over an ankle or a knee, for example.

The tensioning device 140 may be wrapped one or more times around the first arm upper end 102*a* and the second arm upper end 104*a* of the first and second arms 102, 104. Each successive wrapping of the tensioning device 140 may increase the tension so that the first and second arms 102, 104 may apply greater force on the body part placed between the first and second arms 102, 104 of the body massaging apparatus 100. Alternatively, the tensioning device 140 may comprise multiple elasticized bands of different lengths and/or thicknesses, each providing a different amount of tension. Multiple bands may be used simultaneously to achieve different tensions, as required or desired.

According to another example, the tensioning device 140 may have a first end and a second end, with an elasticized band between the first and second ends. A fastener, such as a hook and loop fastener (e.g. Velcro™) fastener may be used to removably attach the first end to the second end. As the fastener is adjustable, the tension of the tensioning device 140 may be adjusted. Thus, where a greater portion of the hook and loop elements of the fastening device are overlapped with each other, the overall length of the tensioning device 140 is shortened and the tensioning device 140 provides greater tension; and where a lesser portion of the hook and loop elements of the fastener are overlapped with each other, the overall length of the tensioning device 140 is lengthened and the tensioning device 140 provides less tension. Snaps, buckles, hooks, and other known fastening devices may also be to fasten the first and second ends of the tensing device 140.

Figure 12:
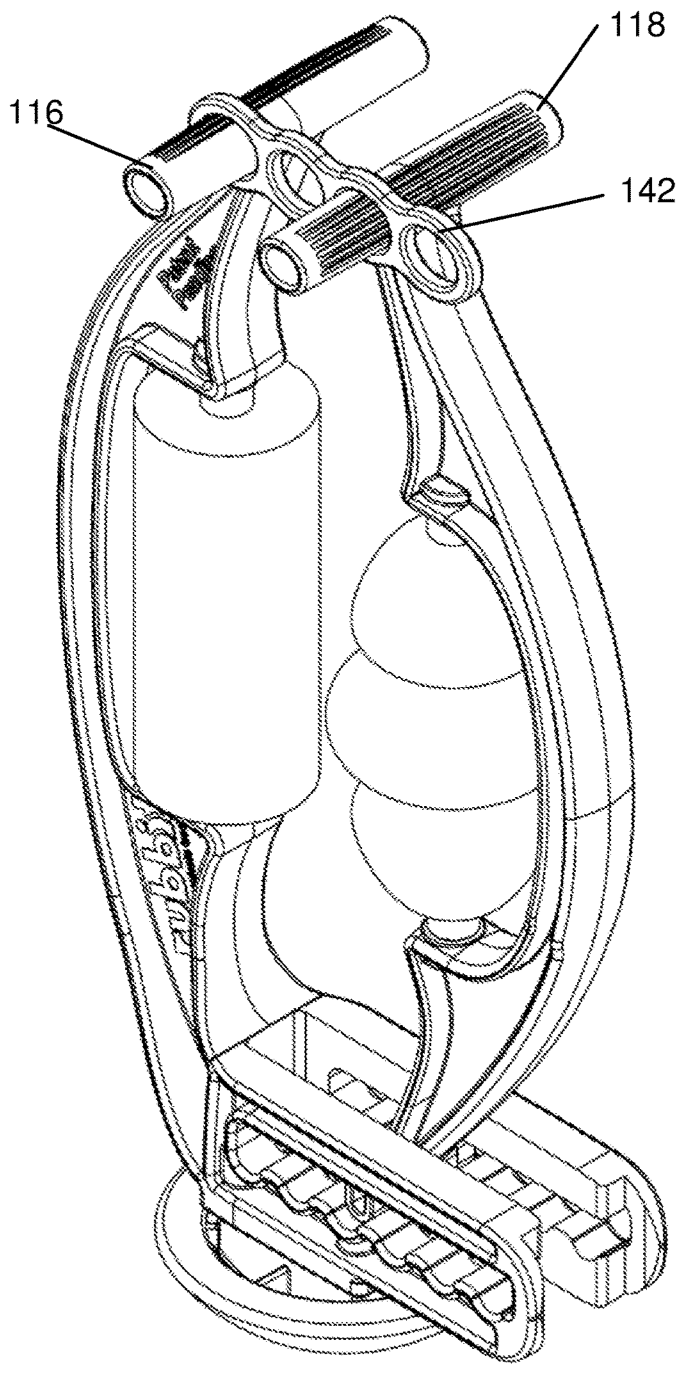
FIG. 12 is a side perspective view of the body massaging apparatus of FIG. 1 utilizing a tensioning device, according to another aspect.
Figure 13:
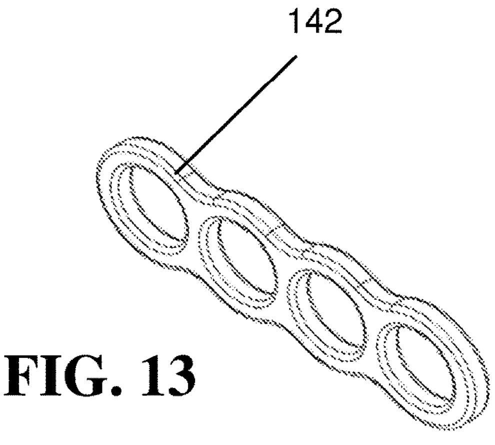
FIG. 13 is a side perspective view of the tensioning device in FIG. 12.
Figure 14:
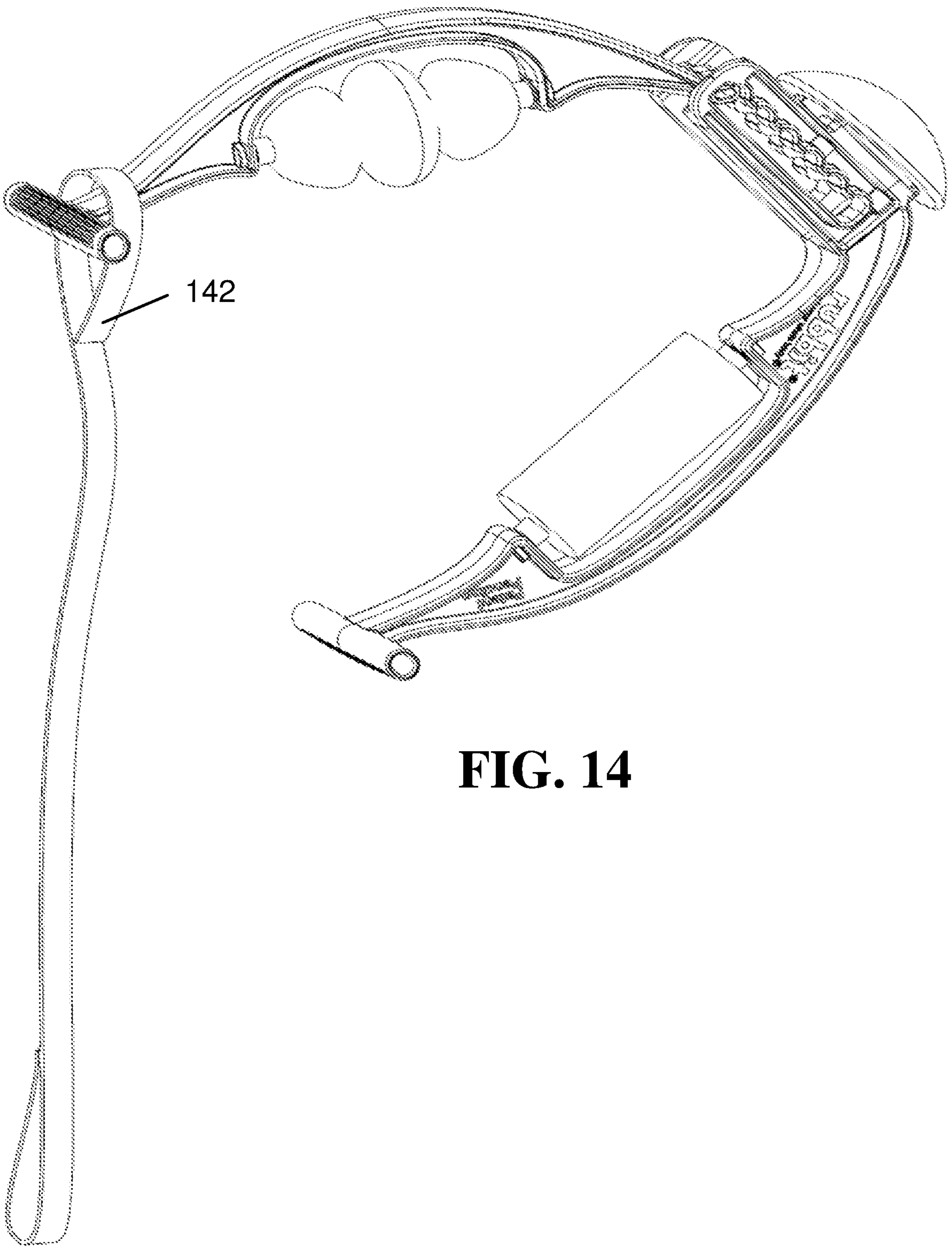
FIG. 14 is a perspective view of the body massaging apparatus of FIG. 1 utilizing a strap, according to one aspect.

Turning to FIGS. 12 and 13, another example of a tensioning device 142 is shown. The tensioning device 142 may be substantially flat having a plurality of holes adapted or configured to receive the first and second handles 116, 118 of the body massaging apparatus 100. The tensioning device 140 may be used by placing one hole over the first handle 116 and a second hole over the second handle 118. As the tensioning device 142 has a plurality of holes, the distance between the handles 116, 118 (and thus the first and second arms 102, 104) may be adjusted as desired by the user.

According to yet another example, an elongated strap 144 may be utilized by a user to position the first arm 102 or the second arm 104.

Figure 15:
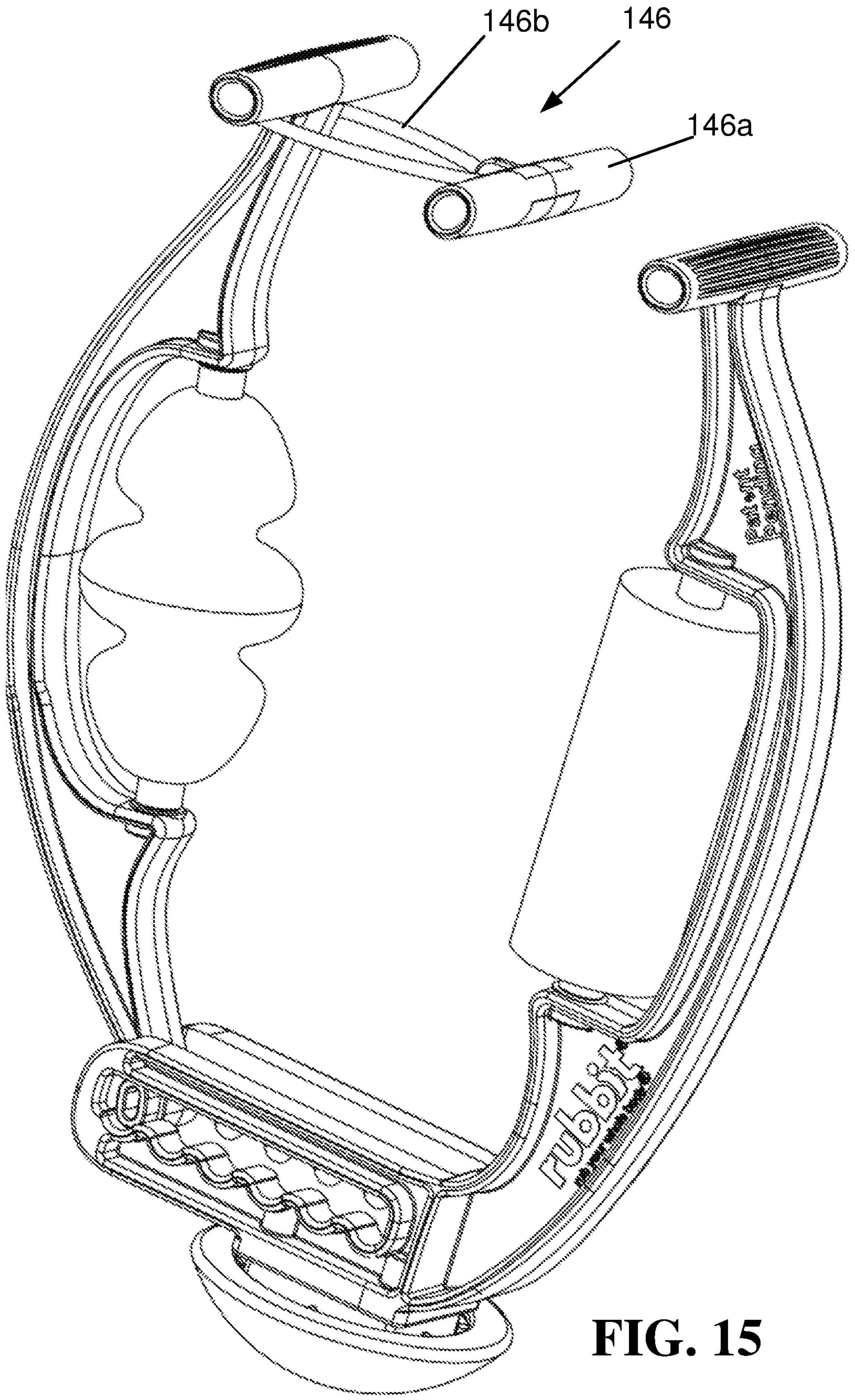
FIG. 15 is a perspective view of the body massaging apparatus of FIG. 1 utilizing a toggle, according to one aspect.
Figure 16:
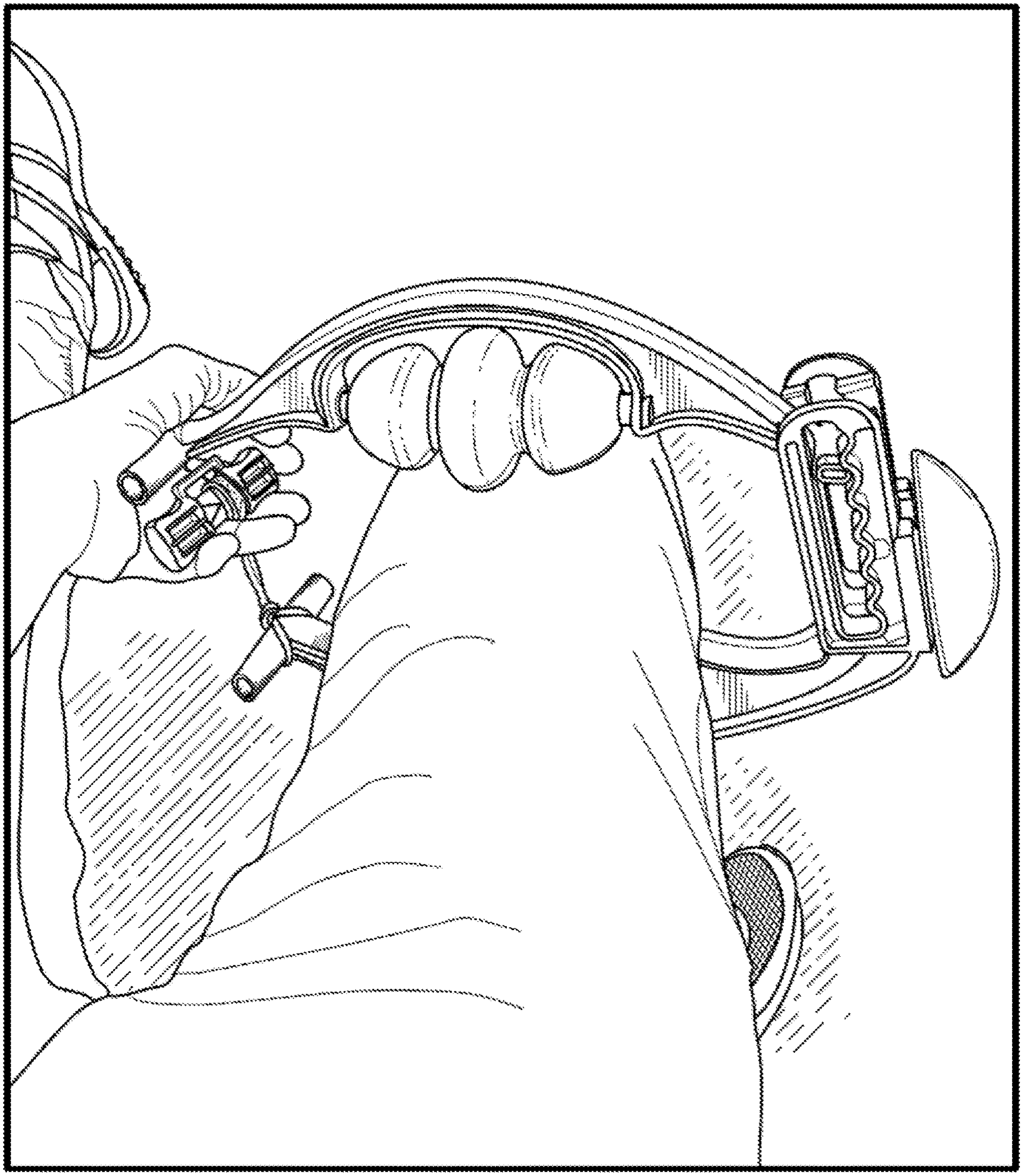
FIG. 16 illustrates the use of the body massaging apparatus of FIG. 15 by a user.

According to yet another example, a toggle 146 may be utilized to assist the user in holding onto both the first and second handles 116, 118 with a single hand. (See FIG. 15) The toggle 146 may comprise an elongated member 146*a* and a band or cord 146*b*. The elongated member 146*a* may be solid or tubular and made of any type of rigid material known in the art while the cord 146*b* may be made from an elasticized or non-elasticized material and form a loop such that the cord 146*b* may be placed around the first arm upper end 102*a* or the second arm upper end 104*a* of the first and second arms 102, 104. FIG. 16 illustrates the use of the body massaging apparatus 100 of FIG. 15 by a user. As shown in FIG. 16, a leg of the user is inserted between the first and second arms 102, 104 of the body massaging apparatus 100. A normal leg of a user increases in size which causes the gap between the first and second handles 116, 118 to increase the farther up the leg the body massaging apparatus 100 is moved. As the user is limited by the size of his or her hand, the user may not be able to hold onto the first and second handle 116, 118 with a single hand the farther up the leg the body massaging apparatus 100 is moved. The toggle 146 may be utilized by the user to assist with holding the first and second handles 116, 118 together in such situations. As shown, the cord 146*b* of the toggle 146 may be wrapped around one of the handles while the user holds onto the elongated member allowing the gap or distance between the handles 116, 118 to increase without the user having to struggle to grasp both handles 116, 118.

Massaging Members

Figure 17:
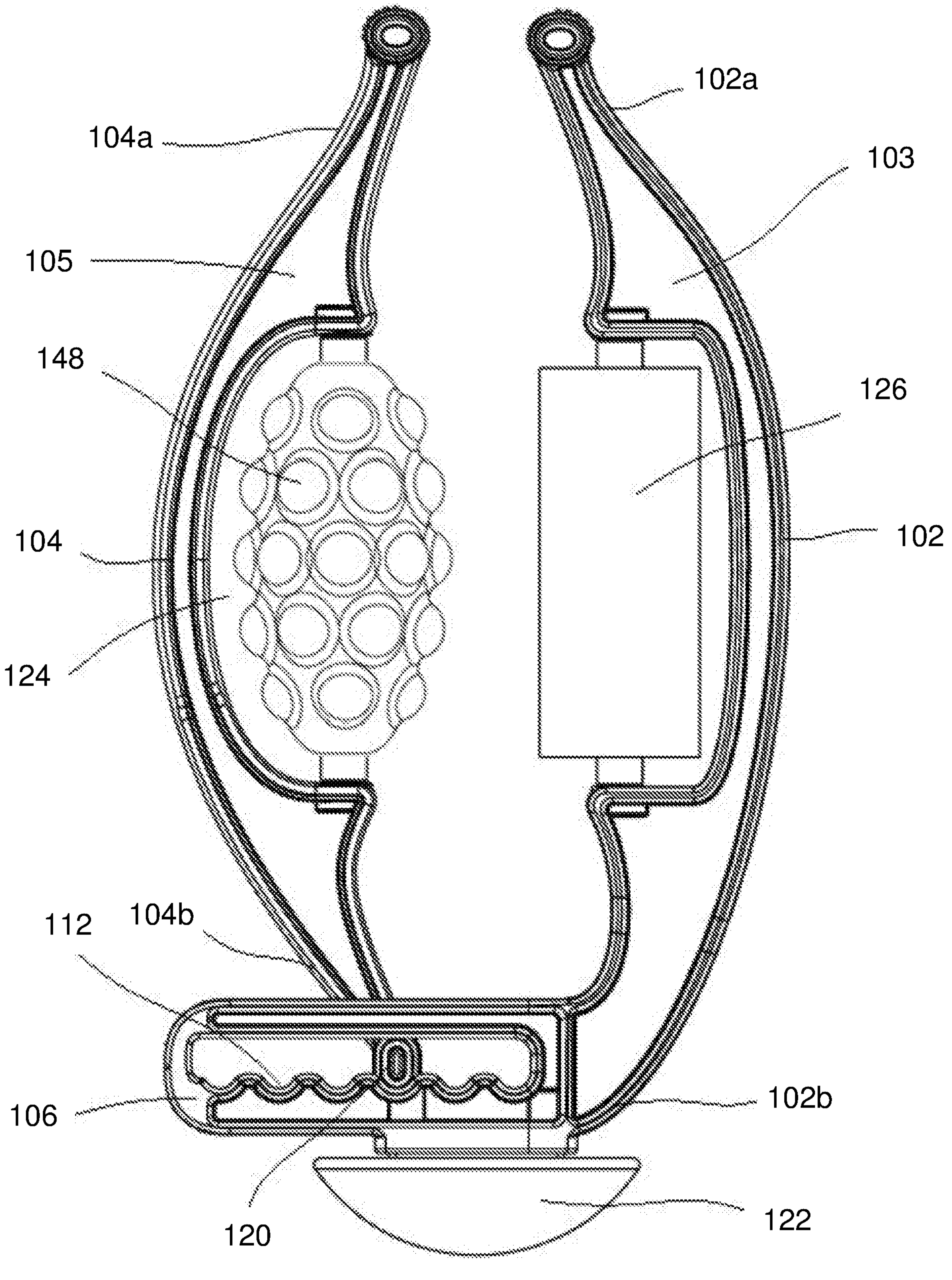
FIG. 17 is a side plan view of the body massaging apparatus of FIG. 1 having a differently configured massaging member.
Figure 18:
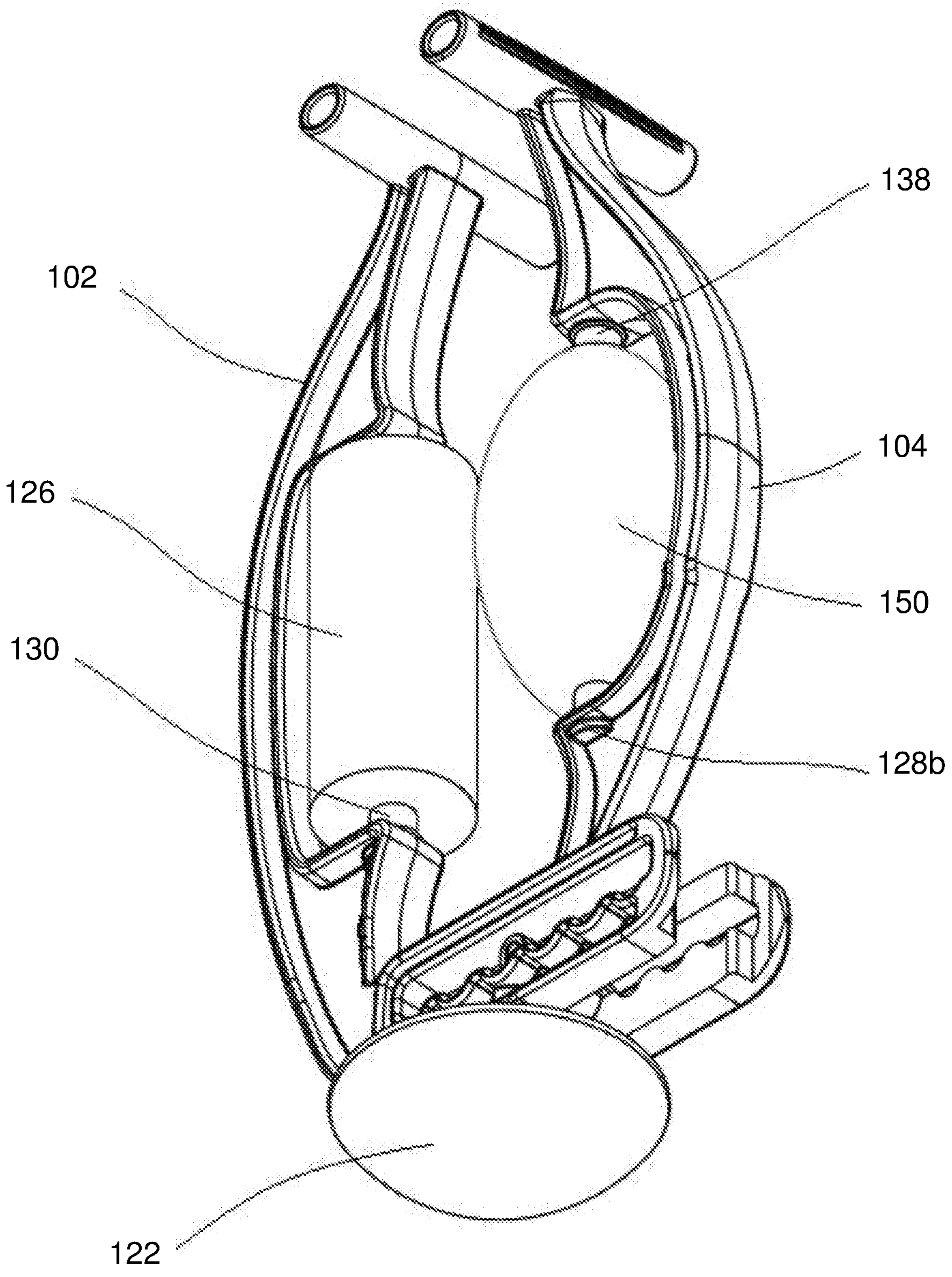
FIG. 18 is a side plan view of the body massaging apparatus of FIG. 1 having yet another differently configured massaging member.

To accommodate different uses of the body massaging apparatus and the needs of user, the massaging members may have different configurations. For example, in one configuration, the massaging member 134 may have a tripart shape, with a medial bulge. (See FIGS. 1-4, 7, 10-13, 15, 16, 19 and 20) In another configuration, the massaging member 150 may have a substantially ovoid, or egg, shape. (See FIG. 18) In yet another configuration, the massaging member 148 may have a substantially ovoid shape with a plurality of protrusions, or nubs, extending from its surface. (See FIG. 17) The configurations of the massaging members shown are by way of example and other configurations known in the art may be utilized.

Figure 19:
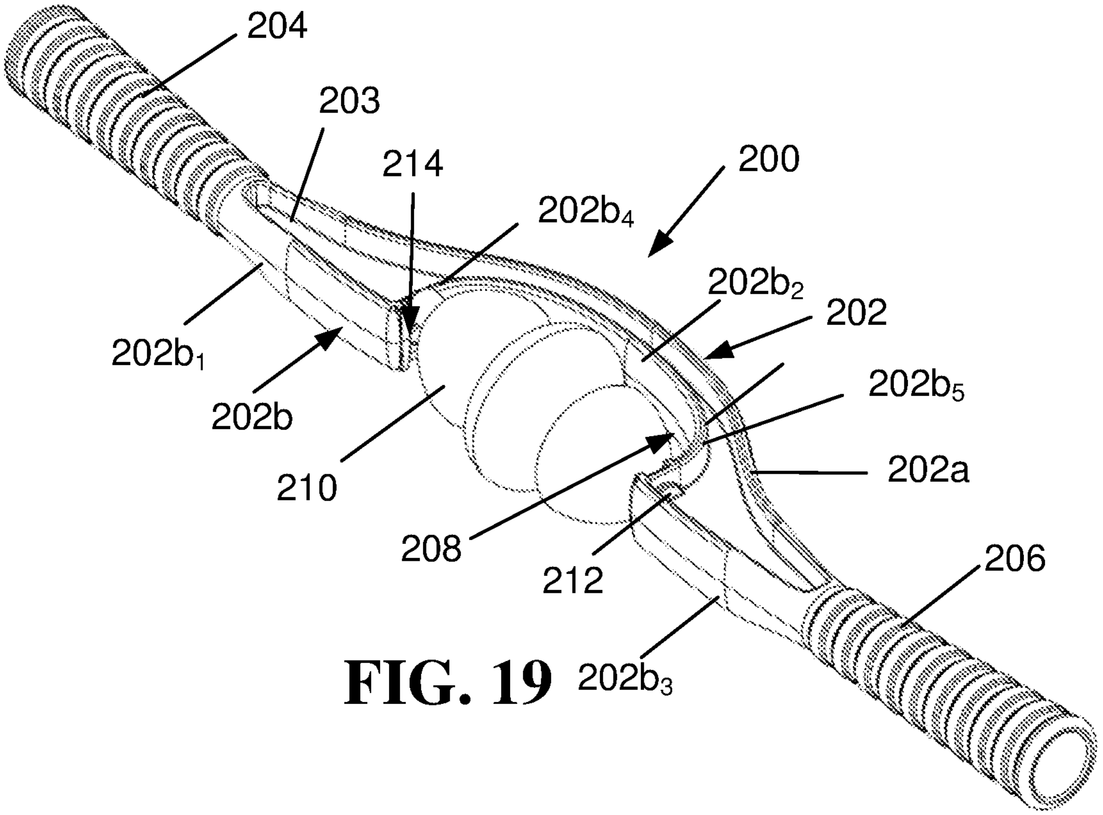
FIG. 19 is a perspective view a body massaging apparatus having a massaging member being inserted according to another aspect.
Figure 20:
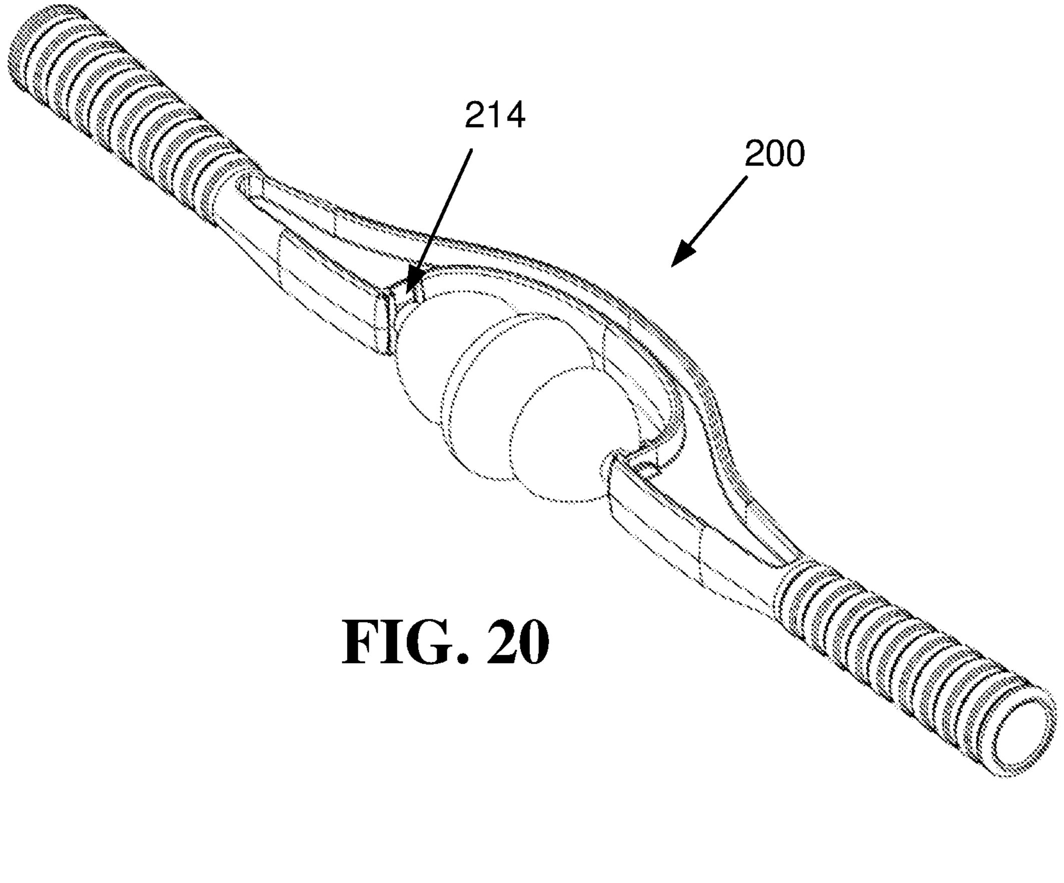
FIG. 20 is a perspective view of the body massaging apparatus of FIG. 20 with the massaging member fulling inserted.

Certain body parts, such as the back or the neck, cannot be placed between the first and second arms 102, 104 of the body massaging apparatus 100. In those cases, the second arm 104 may be removed from the first arm 102 and used independently of the remainder of the body massaging apparatus 100. FIGS. 19 and 20 illustrate a body massaging apparatus 200 according to another aspect where a single arm is utilized. The body massaging apparatus 200 may include a single arm 202 having a first grip 204 at a first end and a second grip 206 at a second end. As with the second arm 104 of the body massaging apparatus 100 shown in FIG. 9, the single arm 202 of the body massaging apparatus 200 may include an arcuate outer surface 202*a*. The inner surface 202*b*, integrally connected to the outer surface by an inner wall 203, may include an upper portion 202$b_1$, a medial portion 202$b_2$ and a lower portion 202$b_3$ where the medial portion 202$b_2$ is integrally connected between the upper portion 202$b_1$ and the lower portion 202$b_3$. The medial portion 202$b_2$ may be connected to the upper portion 202$b_1$ by an upper edge portion 202$b_4$ and the lower portion 202$b_3$ by a lower edge portion 202$b_5$. According to one example, the upper edge portion 202$b_4$ and the lower edge portion 202$b_5$ may extend substantially perpendicularly outward from the medial portion 202$b_2$ creating or forming second cavity 208 in the single arm 202. A massaging apparatus 210 may be inserted within a first and second apertures, as described above with reference to FIG. 9. Alternatively, the first end of a shaft of a massaging member 210 may be inserted into an aperture 212 in the lower edge portion 202$b_5$ and the second end of the shaft of the massaging member 210 may be slid in a channel or ramp 214 on the upper edge portion 202$b_4$. FIG. 20 illustrates the second end of the shaft of the massaging member 210 fully inserted and locked into the channel or ramp 214.

When using the single arm full body massaging apparatus 200, a user may grasp both ends of the single arm 202 and apply a massaging member to the body part requiring therapy (the user's own body part or the body part of a different person). The single arm may utilize a base member allowing the single arm to pivot in relation to the surface. Alternatively, the body massaging apparatus 200 may include a separate cradle member (not shown) to be placed on a surface, with the cradle member being configured to receive the single arm when it is placed therein, holding it secure and stable on the surface. This configuration is useful, for example, when the single arms is being used to provide therapy to the underside of a foot. The cradle member allows users to roll the arches of their feet back and forth while they are standing or sitting.

In yet another embodiment any of the massaging members described herein may be removably attached to the second arm 104 of the body massaging apparatus 100. Once removed, the massaging member can be manually rolled over portions of the body requiring therapy but which are otherwise not susceptible to application of the body massaging apparatus either as described in its primary application (e.g., simultaneous use of both arms 102, 104 of the body massaging apparatus 100) or in its secondary application (e.g., use of the second arm 104 only). For example, the second massaging member 134 may be used to massage the area directly behind the ear.

The body massaging apparatus 100 of the present disclosure may be typically used as follows: With the second arm 104 attached to the first arm 102, the base 122 of the apparatus 100 may be placed onto the user's thigh. The user places the wrist and arm to be massaged between the first and second arms 102, 104 at the level of the massaging member 126 and massaging member 134. The user then grabs with the free hand the two upper handles 116, 118 of the arms 12, 104 of the body massaging apparatus 100 and brings them together until the support member 126 and massaging member 134 come into contact with the ailing limb. The arm and wrist can then be moved in either a translating movement perpendicular to the axes of the support member 126 and massaging member 134, or moved in an alternating rotating movement, or a combination of both types of motions. Due to the resilient nature of the massaging member 134, the contact pressure against the ailing limb may be automatically regulated. At all times the user remains in full control of the applied massaging pressure, which can be released instantly upon the user sensing any pain or discomfort. This instant feedback offers a substantial advantage over automatic massaging devices.

In an alternate usage, the second arm 104 of the body massaging apparatus 100 may be separated from the first arm 102 and is used by the user gripping both ends of the second arm 104 and moving the second arm 104 over a body part such as the neck or shoulders. In one embodiment of this usage, the second arm has a handle at either end, making it easier to grip. (See FIGS. 19-20)

In yet another alternate usage, the second arm 104 of the body massaging apparatus 100 may be separated from the first arm 102 and placed in its cradle (not shown) on the floor, and the user steps on the massaging member 134 and moves the foot over it.

In yet another alternate usage, when massaging the legs, the base 122 of the body massaging apparatus 100 may become a handle to support the position and movement of the body massaging apparatus 100 perpendicular to the leg. The user grasps the two handles 116, 118 with the other hand to regulate pressure being applied to the legs.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:

1. A body massaging apparatus, comprising:

a first arm having a first arm upper end and a first arm lower end;

a pair of elongated members each extending outward longitudinally from the first arm lower end and separated by a channel, the channel having a first channel end and an opposing second channel end terminating in a first channel opening;

each of the elongated members further comprising slotted guideways disposed therein, each extending outward longitudinally having a first slotted guideway end connected to the first arm lower end and a second opposing slotted guideway end terminating in a second slotted guideway opening;

a second arm having a second arm upper end and a second arm lower end;

a securing member having an oblong cross section integrally connected to, and extending perpendicularly outward from each side of the second arm lower end dimensioned and adapted to be removably received within a depression formed in each of the slotted guideways of each of the elongated members in the pair of elongated members, where the securing member having the oblong cross section is arranged such that the second arm is at least partially rotatable relative to the first arm about the securing member having the oblong cross section when the first arm is releasably engaged with the second arm, such that rotation of the second arm in a first direction orients the securing member having the oblong cross section within each depression in the slotted guideway allowing movement along the slotted guideways between a first depression in the slotted guideways to a second depression in the slotted guideways, and rotation of the second arm in a direction opposite the first direction results in releasable engagement between the first arm and the second arm via engagement between the securing member having the oblong cross section and the corresponding depression in the slotted guideways, and where the securing member having the oblong cross section is removeable through the second slotted guideway openings of the slotted guideways allowing for the second arm to be disconnected and disengaged from the first arm;

a first massaging member secured within a medial section of the first arm between a first arm upper grip and a first arm lower grip and arranged and engaged with the first arm such that the first arm is suitable for massaging body parts when disengaged from the second arm; and a second massaging member secured within a medial section of the second arm between a second arm upper grip and a second arm lower grip and arranged and engaged with the second arm such that the second arm is suitable for massaging body parts when disengaged from the first arm.

2. The apparatus of claim 1, further comprising a base connected to bottom surfaces of the elongated members of the first arm.

3. The body massaging apparatus of claim 2, wherein the base is connected to bottom surfaces of the elongated members of the first arm, the base having an upper portion integrally connected to a non-skid lower portion having a semi-circle configuration, the semi-circle configuration allowing a user to continually pivot and move the body massaging apparatus to pivot to orient the body massaging apparatus to a desired angle or position for providing a range of muscular motion and optimized muscular function to targeted muscles.

4. The apparatus of claim 1, wherein the first arm comprises: an outer surface; an inner surface having a first cavity adapted to receive the first massaging member; and an inner wall integrally connected between the outer and inner surfaces.

5. The apparatus of claim 4, wherein the outer surface has an arcuate shape and the inner surface comprises:

an upper portion; a lower portion; and a medial portion integrally connected between the upper portion and the lower portion by an upper edge portion and a lower edge portion, the upper and lower edge portions extend perpendicularly outward from the medial portion forming the first cavity.

6. The apparatus of claim 5, wherein the upper portion and the lower portion are located within a first vertical plane and the medial portion is located within a second vertical plane, where the first vertical plane is different than the second vertical plane.

7. The apparatus of claim 1, wherein the second arm comprises: an outer surface; an inner surface having a second cavity adapted to receive the second massaging member; and an inner wall integrally connected between the outer and inner surfaces.

8. The apparatus of claim 7, wherein the outer surface has an arcuate shape and the inner surface comprises:

an upper portion;

a lower portion; and a medial portion integrally connected between the upper portion and the lower portion by an upper edge portion and a lower edge portion, the upper and lower edge portions extend perpendicularly outward from the medial portion forming the second cavity.

9. The apparatus of claim 8, wherein the upper portion and the lower portion are located within a first vertical plane and the medial portion is located within a second vertical plane, where the first vertical plane is different than the second vertical plane.

10. The apparatus of claim 1, further comprising a tensioning member comprising an elasticized band adapted to be wrapped around the first upper arm end and the second upper arm end for adjusting tension between the first and second arms.

11. The apparatus of claim 1, wherein the first and second arms and the first and second massaging members are shaped and dimensioned to adjustably retain a human body part between the first massaging member and the second massaging member when the first arm is engaged with the second arm and the first arm upper end and the second upper arm end are held in close proximity to each other, whereby pressure that is applied to the human body part is variable and dynamically leveraged as the human body part is moved between the first and second arms relative thereto.

12. A body massaging apparatus, comprising:

a first arm releasably engageable with, and disengageable from a second arm via sliding and rotatable engagement between a securing member extending outwardly from a second arm lower end and a corresponding pair of slots disposed into a first arm lower end;

the first arm further comprising a first massaging member secured within a medial section of the first arm between a first arm upper grip and a first arm lower grip and arranged and engaged with the first arm such that the first arm is suitable for massaging body parts when disengaged from the second arm; and the second arm further comprising a second massaging member secured within a medial section of the second arm between a second arm upper grip and a second arm lower grip and arranged and engaged with the second arm such that the second arm is suitable for massaging body parts when disengaged from the first arm.

13. A massage system comprising:

a first arm comprising a first massaging member secured within a medial section of the first arm between a first arm upper grip and a first arm lower grip and arranged and engaged with the first arm such that the first arm is independently suitable for massaging body parts; a second arm comprising a second massaging member secured within a medial section of the second arm between a second arm upper grip and a second arm lower grip and arranged and engaged with the second arm such that the second arm is independently suitable for massaging body parts;

the first arm releasably engageable with, and disengageable from the second arm via sliding and rotatable engagement between a securing member depending outwardly from a second arm lower end and a corresponding pair of slots disposed into a first arm lower end;

wherein an arrangement of the first and second messaging members is suitable for massaging different portions of a single body part disposed between the first and second messaging members when the first arm is engaged with the second arm.

* * * * *